(12) United States Patent
Xie et al.

(10) Patent No.: US 12,407,369 B2
(45) Date of Patent: Sep. 2, 2025

(54) COMMUNICATION SYSTEM AND ELECTRONIC DEVICE

(71) Applicant: BEIJING XIAOMI MOBILE SOFTWARE CO., LTD., Beijing (CN)

(72) Inventors: Cong Xie, Beijing (CN); Lu Shi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 18/072,691

(22) Filed: Nov. 30, 2022

(65) Prior Publication Data

US 2024/0072834 A1 Feb. 29, 2024

(30) Foreign Application Priority Data

Aug. 26, 2022 (CN) .......................... 202211034772.8

(51) Int. Cl.
*H04B 1/3816* (2015.01)
*H04B 5/72* (2024.01)

(52) U.S. Cl.
CPC ............. *H04B 1/3816* (2013.01); *H04B 5/72* (2024.01)

(58) Field of Classification Search
CPC ....... H04B 1/3816; H04B 5/72; H04W 88/06; H04W 8/183; Y02D 30/70
See application file for complete search history.

(56) References Cited

U.S. PATENT DOCUMENTS

| | | | | |
|---|---|---|---|---|
| 9,705,555 B2 * | 7/2017 | Ezekiel | ................. | H04B 1/401 |
| 11,432,262 B2 * | 8/2022 | Huang | ................. | H04W 76/16 |
| 2009/0150704 A1 * | 6/2009 | Van Bosch | ....... | H04M 1/72412 |
| | | | | 713/340 |
| 2013/0316766 A1 | 11/2013 | Nousiainen et al. | | |
| 2015/0099559 A1 | 4/2015 | Bendixen et al. | | |
| 2016/0249301 A1 * | 8/2016 | Xiao | ................... | H04W 52/243 |
| 2018/0027406 A1 * | 1/2018 | Murray | ................. | H04M 1/724 |
| | | | | 455/558 |
| 2018/0109291 A1 | 4/2018 | Peng et al. | | |
| 2018/0115198 A1 * | 4/2018 | Chen | ....................... | H03F 3/245 |
| 2023/0035452 A1 * | 2/2023 | Kim | ........................ | H01F 38/00 |

FOREIGN PATENT DOCUMENTS

CN 111741150 A * 10/2020
WO 2021185105 A1 9/2021

OTHER PUBLICATIONS

Extended European Search Report of EP Application No. 22216432.9 dated Aug. 21, 2023, (9p).

* cited by examiner

Primary Examiner — Ankur Jain
(74) Attorney, Agent, or Firm — Arch & Lake LLP (57) ABSTRACT

A communication system and an electronic device are provided. The communication system includes a processing chip and two sets of communication circuits, each set of the communication circuit includes a switch circuit, a SIM card port circuit and at least one eSIM circuit, the switch circuit includes a first terminal and at least two second terminals, in which the first terminal is connected to a communication interface of the processing chip, the at least two second terminals are respectively connected to the SIM card port circuit and the at least one eSIM circuit in one-to-one correspondence, and the first terminal of the switch circuit is switched to be connected with each second terminal.

17 Claims, 5 Drawing Sheets

COMMUNICATION SYSTEM AND ELECTRONIC DEVICE

CROSS-REFERENCE TO RELATED APPLICATION

This application is based on and claims priority to Chinese Patent Application No. 202211034772.8 filed on Aug. 26, 2022, the disclosure of which is hereby incorporated by reference in its entirety for all purposes.

TECHNICAL FIELD

The present disclosure relates to the technical field of electronic device, and more specifically, to a communication system and an electronic device.

BACKGROUND

Nowadays, Dual SIM Dual Standby (DSDS) has become the standard function of communication electronic devices. Taking smart phones as an example, with the increasing dependence of people on mobile phones, dual SIM (Subscriber Identity Module) cards can no longer meet the needs of some users.

SUMMARY

To enrich the SIM card functions of electronic devices, the present disclosure provides a communication system and an electronic device with the communication system.

In a first aspect, the present disclosure provides a communication system, including:
- a processing chip that includes a first communication interface and a second communication interface; and
- two sets of communication circuits, in which one set of communication circuits is connected to the first communication interface, and the other set of communication circuits is connected to the second communication interface;
- in which each set of the communication circuits includes a switch circuit, a SIM card port circuit and at least one eSIM circuit, the switch circuit includes a first terminal and at least two second terminals, and the first terminal is connected to the first communication interface or the second communication interface, the at least two second terminals are respectively connected to the SIM card port circuit and the at least one eSIM circuit in one-to-one correspondence, and the first terminal of the switch circuit is switched to be connected with each second terminal.

BRIEF DESCRIPTION OF THE DRAWINGS

In order to more clearly explain the specific embodiments of the present disclosure or the technical solutions in the prior art, the drawings that need to be used in the description of the specific embodiments or the prior art will be briefly introduce below. Obviously, the drawings in the following description are some embodiments of the present disclosure. For those of ordinary skill in the art, other drawings can be obtained according to these drawings without any creative effort.

DETAILED DESCRIPTION

Hereinafter, the technical solutions of the present disclosure will be clearly and completely described with reference to the accompanying drawings. Obviously, these described embodiments are part of the embodiments of the present disclosure, rather than all of the embodiments of the present disclosure. All other embodiments obtained by those of ordinary skill in the art based on the embodiments in the present disclosure without any creative effort belong to the protection scope of the present disclosure. Furthermore, the technical features involved in different embodiments of the present disclosure described below can be combined with each other as long as they do not constitute conflicts with each other.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Nowadays, Dual SIM Dual Standby (DSDS) has become the standard function of communication electronic devices. Users can insert two entity SIM (Subscriber Identity Module) cards and use the same electronic device to realize the simultaneous standby of two mobile phone numbers.

However, with the increasingly complete functions of electronic devices, people rely more and more on smart phones. For some users, dual SIM cards can no longer meet their usage requirements.

For example, in some scenarios, users need to use multiple WeChat numbers at the same time, but each mobile phone number can only be bound with one WeChat number. That is to say, the dual SIM card mobile phone in the related technologies can only register at most two WeChat numbers. If users want to use more WeChat numbers, they have to carry two or more mobile phones at the same time.

For example, in other scenarios, users need to use multiple mobile phone numbers of multiple communication operators at the same time. The dual SIM card mobile phones in the related technologies can only keep two mobile phone numbers residing in the network at most. If users want to switch to other mobile phone numbers, they need to pull out the original SIM card and insert the new SIM card, which is very cumbersome to operate.

It can be seen that people have a real demand for more SIM card functions. However, for mobile phone manufacturers, on one hand, the internal space stack of mobile phones is highly integrated nowadays, and more SIM cards mean that more card slot space and circuit wiring are needed, resulting in increased design difficulty.

On the other hand, the mobile phone SoC (System on Chip) of the mainstream platforms can only provide at most two paths of data signal interfaces for SIM card communication, which limits the mobile phone to realize more SIM card functions. The cost will be unacceptable to mobile phone manufacturers if improvement starts from the bottom interface design of the mobile phone SoC chip. Therefore, increasing the number of mobile phone SIM cards by increasing the number of SoC chip interfaces is only theoretical and difficult to apply.

The eSIM (Electronic SIM card) is also called embedded SIM card, which means that the physical card of the traditional SIM card is directly embedded into the chip, instead of being added to the device as an independent detachable component, and the user does not need to insert the physical SIM card, such that the card slot space of the devices is saved. However, as stated above, although the use of the eSIM can save a certain amount of card slot space, it is limited by the design of public chip, and can only realize the scheme of "single SIM card+single eSIM" or "double eSIM", but cannot realize more SIM card functions.

That is, limited by the internal space of mobile phones and the design of hardware IC (integrated circuit), it is difficult to continuously increase the number of SIM cards, resulting in that users have to carry two or more mobile phones, which is very inconvenient.

Based on the above-mentioned defects existing in the related technologies, the embodiments of the present disclosure provide a communication system and an electronic device with the communication system, aiming at realizing more SIM card functions on one device and improving the convenience of device use.

In a first aspect, the embodiments of the present disclosure provide a communication system, and the communication system can be applied to electronic devices. The electronic devices described in the present disclosure can be any device type with the communication capability, such as smart phones, tablet computers, wearable devices, etc., and the present disclosure makes no limitation thereto.

In some embodiments, the communication system described in the present disclosure includes a processing chip and two sets of communication circuits.

The processing chip refers to the main processor of the electronic devices, has one or more processing cores, and can perform single-threaded or multi-threaded operations, which are used to parse instructions to perform operations such as acquiring data, performing logical operation functions and issuing operation processing results.

For example, in some embodiments, the processing chip can be the SoC chip, the CPU (central processing unit) chip, etc., and the present disclosure makes no limitation thereto.

In the embodiments of the present disclosure, the processing chip includes two communication interfaces, namely a first communication interface and a second communication interface. The first communication interface and the second communication interface can be understood as data interfaces used by the processing chip for data interaction with the physical SIM card or eSIM. The processing chip can access the user identification information on the SIM card or eSIM through the first communication interface and the second communication interface.

It can be understood that, taking smart phones as an example, at present, the mobile phone processing chips of mainstream platforms have at most two data interfaces for data interaction with SIM cards or eSIM, such as Qualcomm platform, MediaTek (MTK) platform, Hisilicon platform, etc.

In the embodiments of the present disclosure, one of the two sets of communication circuits is connected to the first communication interface of the processing chip, and the other set is connected to the second communication interface of the processing chip.

Illustration is provided below with one set of communication circuits being taken as an example. In the embodiments of the present disclosure, the communication circuit includes a switch circuit, a SIM card port circuit and at least one eSIM circuit.

The SIM card port circuit refers to the port provided by the electronic devices for plugging and unplugging the physical SIM card and its related circuits. Taking common smart phones as an example, the smart phones generally have a pluggable card holder and a card slot for inserting the card holder. The inside of the card slot corresponds to the SIM card port circuit on the motherboard of the mobile phone. Users place the physical SIM card in the card holder, and then insert the card holder and the SIM card into the card slot as a whole, such that the SIM card can be connected (conducted) with the SIM card port circuit. Those skilled in the art can understand this, and the present disclosure makes no limitation thereto.

Furthermore, it can be understood that in the embodiments of the present disclosure, each set of communication circuits includes one SIM card port circuit, such that the two sets of communication circuits include two SIM card port circuits in total. That is, for the hardware design of electronic devices, it is only necessary to keep consistent with the dual-card terminal of the related technologies, and the design difficulty of hardware structure will not be increased.

In the embodiments of the present disclosure, the communication circuit includes at least one eSIM circuit in addition to the above-mentioned SIM port circuit for assembling the physical SIM card. The eSIM circuit can be understood as the related circuit that realizes the function of the electronic SIM card, such as the Near Field Communication (NFC) chip, the eSIM chip, etc.

It is worth noting that in the related technologies, the eSIM modules provided by respective chip platforms are all integrated in the NFC chip, that is, the related circuits for realizing the eSIM function are integrated in the NFC chip. Accordingly, in some embodiments of the present disclosure, the eSIM circuit can be an NFC chip, and in other embodiments, the eSIM circuit can also be an independent eSIM chip, detailed description will be provided in the following embodiments of the present disclosure.

In the embodiments of the present disclosure, each set of communication circuits includes at least one eSIM circuit, that is, the number of the eSIM circuits can be designed according to specific requirements. For example, in some embodiments, each set of communication circuits can merely include one eSIM circuit, such that each set of communication circuits includes one SIM card port circuit and one eSIM circuit in total, which can realize two mobile phone number functions in total, and two sets of communication circuits can realize four mobile phone number functions. For example, in other embodiments, each set of communication circuits can include two eSIM circuits, such that each set of communication circuits includes one SIM card port circuit and two eSIM circuits in total, which can realize three mobile phone number functions in total, and two sets of communication circuits can realize six mobile phone number functions. This can be understood by those skilled in the art, and no details will be described in the present disclosure.

It can be understood that each set of communication circuits only occupies one communication interface on the processing chip. In other words, in the embodiments of the present disclosure, although each set of communication circuits includes one physical SIM card and one or more eSIM, each set of communication circuits can merely realize the communication function of one SIM card. Accordingly, in the embodiments of the present disclosure, it is necessary to use the switch circuit to switch on the multiple SIM card functions included in each set of communication circuits.

Specifically, the switch circuit includes a first terminal and at least two second terminals, and the first terminal can be switched to be connected with any one of the at least two second terminals. For example, in an example, the switch circuit includes a first terminal and two second terminals, the two second terminals are a second terminal A and a second terminal B respectively. When the first terminal is connected with the second terminal A, the first terminal is disconnected from the second terminal B; on the contrary, when the first terminal is connected with the second terminal B, the first terminal is disconnected from the second terminal A.

In the embodiments of the present disclosure, the first terminal of the switch circuit is connected to the first communication interface of the processing chip, and the second terminal is connected to the SIM card port circuit and the eSIM circuit as described in the preceding in one-to-one correspondence. In other words, the number of the second terminals of the switch circuit is the same as the sum of the number of the SIM card port circuits and the number of the eSIM circuits.

For example, in an example, the communication circuit includes one SIM card port circuit and one eSIM circuit, such that the switch circuit of the communication circuit can be provided with two second terminals, in which one of the second terminals is connected to the SIM card port circuit and the other thereof is connected to the eSIM circuit.

Of course, those skilled in the art can understand that the number of the second terminals of the switch circuit is not limited to the above example, as long as it is consistent with the number of the SIM card port circuit and the eSIM circuits of the communication circuit.

In the embodiments of the present disclosure, the first terminal of the switch circuit is connected to the communication interface of the processing chip, and the second terminal of the switch circuit is connected to each SIM card circuit, such that the communication between the processing chip and the target SIM card can be realized by controlling the switching of the connection of the first terminal and the second terminal.

For example, in an example, one of the two sets of communication circuits includes one SIM card port circuit and one eSIM circuit, which correspond to SIM card 1 and SIM card 2 respectively; another set of communication circuits includes one SIM card port circuit and one eSIM circuit, which correspond to SIM card 3 and SIM card 4 respectively.

Therefore, by controlling the switching of the connection of the first terminal and the second terminal of the switch unit, it is possible to realize, for example, simultaneous standby of SIM card 1 and SIM card 3, simultaneous standby of SIM card 1 and SIM card 4, simultaneous standby of SIM card 2 and SIM card 3, and simultaneous standby of SIM card 2 and SIM card 4. It can be seen that in the embodiments of the present disclosure, multiple SIM card functions can be realized without changing the underlying structure of the chip. Moreover, when the circuit layout allows, the eSIM circuit can be expanded as much as possible, and more SIM card functions can be realized while basically keeping the hardware structure of traditional electronic devices.

It can be seen from the above that, in the embodiments of the present disclosure, the switch unit is used to switch between the physical SIM card and the eSIM, such that multiple SIM card functions of the electronic device can be realized without increasing the card slot space of the electronic device or changing the underlying structure of the device chip, and the convenience of users can be improved.

Figure 1:
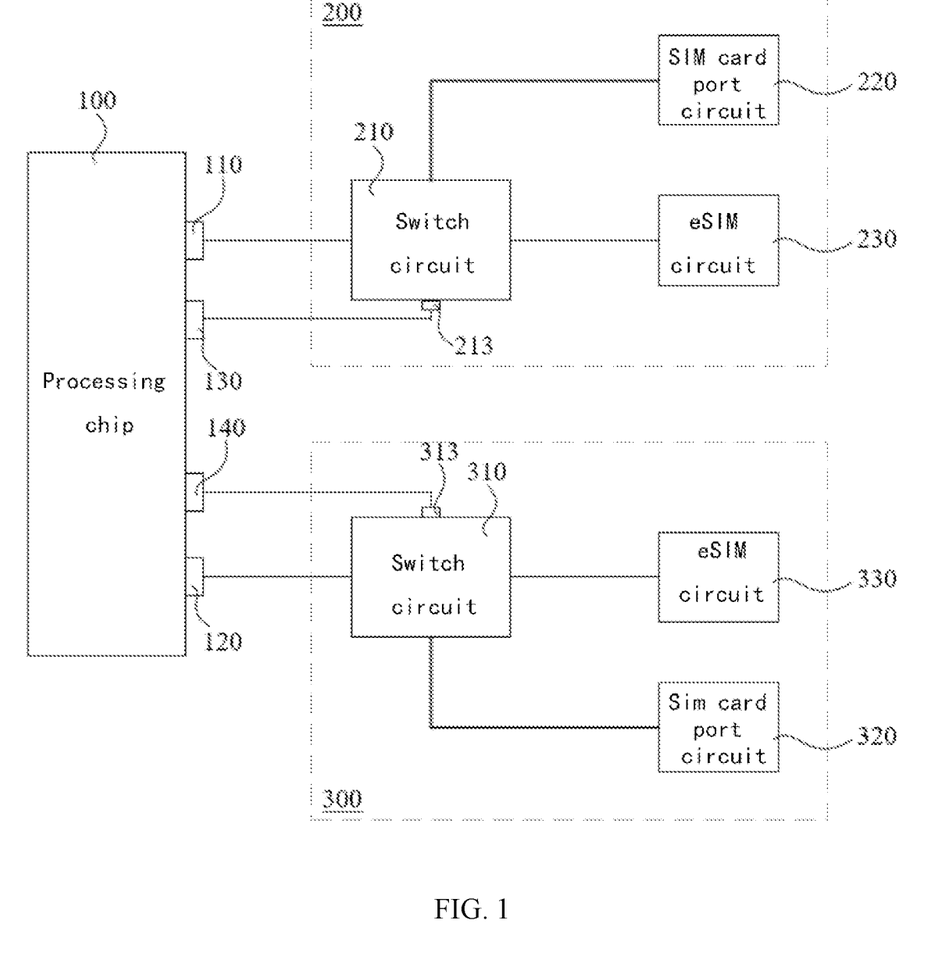
FIG. 1 is a circuit structure diagram of a communication system according to some embodiments of the present disclosure.

FIG. 1 is a structure diagram of a communication system according to some embodiments of the present disclosure. The structure and principle of the communication system according to the embodiments of the present disclosure will be described below with reference to the example of FIG. 1.

As shown in FIG. 1, in some embodiments, the communication system of the present disclosure includes a processing chip 100, a first communication circuit 200, and a second communication circuit 300.

Taking the smart phone as an example, the processing chip 100 can be understood as the SoC chip of the mobile phone, the SoC chip includes a first communication interface 110 and a second communication interface 120, and the first communication interface 110 and the second communication interface 120 are used to access the physical SIM card or the eSIM of the mobile phone.

In some embodiments, the first communication interface 110 and the second communication interface 120 each include four lines, namely, UIM_EN is an enable line, UIM_DATA is a data line, UIM_CLK is a clock line and UIM_RST is a reset line. This can be understood by those skilled in the art, and no details will be described in the present disclosure.

In the example of FIG. 1, the first communication circuit 200 and the second communication circuit 300 each include one SIM card port circuit and one eSIM circuit, whose structures and working principles are the same. The first communication circuit 200 will be taken as an example for detailed explanation below.

Referring to FIG. 1, the first communication circuit 200 includes a switch circuit 210, one SIM card port circuit 220 and one eSIM circuit 230.

The switch circuit 210 includes one first terminal and two second terminals. The first terminal of the switch circuit 210 is connected to the first communication interface 110 of the processing chip 100. One second terminal of the switch circuit 210 is connected to the SIM card port circuit 220, and the other second terminal is connected to the eSIM circuit 230.

In the embodiments of the present disclosure, the SIM card port circuit 220 refers to the port provided by the smart phone for plugging and unplugging the physical SIM card and its related circuits, and the user can insert the physical SIM card into the SIM card port circuit through the card holder and the card slot of the smart phone. The eSIM circuit 230 refers to an electronic SIM card module which is integrated inside the smart phone without plugging or unplugging the physical card. The switch circuit can be any hardware circuit capable of realizing circuit gating, such as the multiplex switch, the Field Programmable Gate Array (FPGA) chip, etc., and the present disclosure makes no limitation thereto.

Continuing to make reference to FIG. 1, in the example of the present disclosure, the switch circuit 210 includes a control terminal 213, the control terminal 213 is connected to a first control pin 130 of the processing chip 100, such that the processing chip 100 can send a control signal to the control terminal 213 of the switch circuit 210 through the first control pin 130, and the switch circuit 210 switches the connection between the first terminal and the second terminal according to the control signal.

For example, in an example, when the user selects the eSIM circuit 230, the processing chip 100 outputs a high-level signal to the control terminal 213 of the switch circuit 210 through the first control pin 130 based on the user's input instruction, and the switch circuit 210 controls the first terminal to be connected with the eSIM circuit 230 based on the received high-level signal, such that the eSIM circuit 230 establishes a communication connection with the first communication port 110 of the processing chip 100. Similarly, when the user selects the SIM card port circuit 220, the processing chip 100 outputs a low-level signal to the control terminal 213 of the switch circuit 210 through the first control pin 130 based on the user's input instruction, and the switch circuit 210 controls the first terminal to be connected with the SIM card port circuit 220 based on the received low-level signal, such that the SIM card port circuit 220 establishes a communication connection with the first communication port 110 of the processing chip 100.

In the example of FIG. 1, the working principle of the second communication circuit 300 is similar to that of the first communication circuit 200 described above. The first terminal of the switch circuit 310 is connected to the second communication interface 120 of the processing chip 100; the two second terminals of the switch circuit 310 are connected to the SIM card port circuit 320 and the eSIM circuit 330 respectively; and the control terminal of the switch circuit 310 is connected to the second control pin 140 of the processing chip 100 such that the processing chip 100 can send a control signal to the control terminal 313 of the switch circuit 310 through the second control pin 140, and the switch circuit 310 switches the connection of the first terminal and the second terminal based on the control signal. Those skilled in the art can understand and make full implementation by referring to the above description, and no details will be described in the present disclosure.

In the example of FIG. 1, the SIM card corresponding to the SIM card port circuit 220 is defined as "SIM card 1", the SIM card corresponding to the eSIM circuit 230 is defined as "eSIM 1", the SIM card corresponding to the SIM card port 320 is defined as "SIM card 2", and the SIM card corresponding to the eSIM circuit 330 is defined as "eSIM 2". As can be seen from the above, in the example of the present disclosure, two physical SIM cards and two eSIMs can be implemented in the same mobile terminal, and the network-resident standby of any SIM card can be realized, such as SIM card 1 and SIM card 2, SIM card 1 and eSIM2, eSIM1 and SIM card 2, and eSIM1 and eSIM2 simultaneously residing in the network, by controlling the switching on of the switch circuit.

In some embodiments, the first control pin 130 and the second control pin 140 of the processing chip 100 can be GPIO (General Purpose Input/Output) pins of the processing chip 100, and various mature communication protocols can be simulated by GPIO pins, so as to control the switching circuit. Those skilled in the art can understand this, and the present disclosure makes no limitation thereto.

Furthermore, it is worth noting that in the related technologies, the eSIM circuits provided by respective chip platforms are all integrated in the NFC chip. Taking the smart phone as an example, the current public NFC chip provides merely one eSIM circuit interface, which thereby also limits the realization of more eSIM functions in the smart phone.

More importantly, the inventor of the present application found through research that as for the eSIM module integrated in the NFC chip, the data signal quality of the eSIM is often poor, especially in the scenarios such as network authentication, authentication failure or authentication disabling often appears, resulting in poor user experience. Through further research, it is found that this is because of being limited by the layout settings of the mobile phone, the layout of the NFC chip on the motherboard is often far away from the SoC chip, which requires longer wiring, resulting in higher line impedance and poor data signal quality.

Therefore, in some embodiments of the present disclosure, each eSIM circuit is no longer integrated in the NFC chip, an independent eSIM chip is adopted instead, and the eSIM chip is disposed near the processing chip 100 and the switch circuit on the motherboard, thereby the path loss is reduced, the line impedance is lowered, the signal quality is improved, and the risk of failure in network access authentication is reduced.

With the development of the SIM card technique, physical SIM cards have gone through many iterations, from standard card (Mini SIM) to micro card (Micro SIM) to Nano card (Nano SIM). Different types of SIM cards require different power supply voltages and different data signal voltages, such as 1.8V power supply voltage and data signal voltage for the standard card and 3V for the Nano card.

Therefore, in some embodiments of the present disclosure, in order to make the SIM card port circuit compatible with various types of physical SIM cards at the same time, each set of communication circuits further includes a voltage transform circuit (transformer circuit), which will be described below with reference to the example of FIG. 2.

Figure 2:
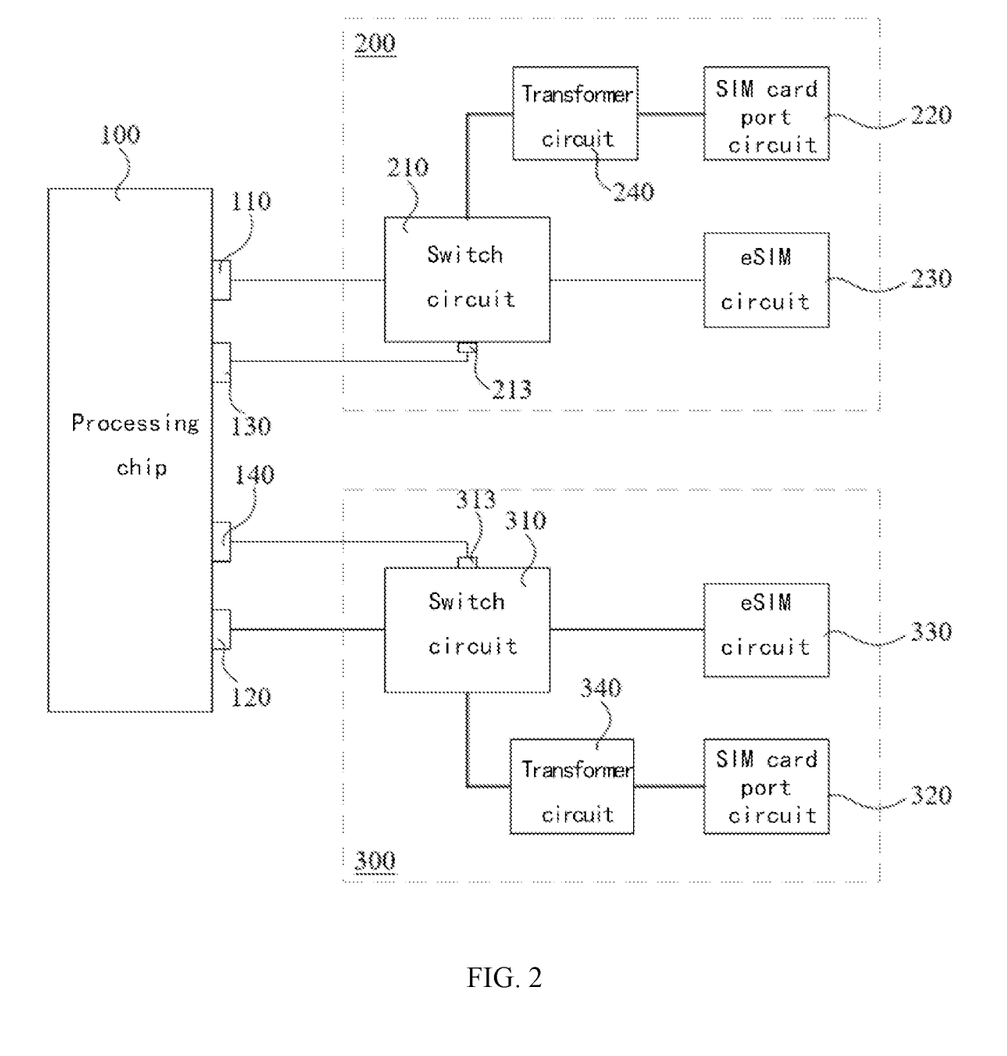
FIG. 2 is a circuit structure diagram of a communication system according to some embodiments of the present disclosure.

As shown in FIG. 2, on the basis of the exemplary embodiment of FIG. 1, each set of communication circuits further includes a transformer circuit. For example, taking the first communication circuit 200 as an example, the first communication circuit 200 further includes a transformer circuit 240, the input terminal of the transformer circuit 240 is connected to the second terminal of the switch circuit 210, and the output terminal of the transformer circuit 240 is connected to the SIM card port circuit 220.

The voltage transformer circuit is used to adjust the voltage of the passing data signal. For example, in an example, the data signal voltage outputted by the switch circuit 210 is constant at 1.8V. When the data signal voltage required by the SIM card inserted into the SIM card port circuit 220 is 1.8V, the voltage transformer circuit 240 performs no boosting processing, that is, the voltages of the input signal and the output signal are both 1.8V. When the data signal voltage required by the SIM card inserted into the SIM card port circuit 220 is 3V, the voltage transformer circuit 240 boosts the inputted 1.8V data signal, thereby outputting the 3V data signal, which meets the working requirements of the SIM card.

The working principle of the transformer circuit 340 included in the second communication circuit 300 is the same as that of the second communication circuit 300, which can be understood by those skilled in the art with reference to the above, and no details will be described in the present disclosure.

In some embodiments, the voltage transformer circuit can adopt a level shift circuit. The basic principle of the level shift circuit is that the level shift of the input signal and the output signal can be controlled based on the reference level. This will be explained in the following embodiments of the present disclosure in connection with the power supply principle of the communication system and will not be described in detail here.

It can be seen from the above that, in the embodiments of the present disclosure, the data signal voltage inputted to the SIM card port circuit is converted by the voltage transformer circuit, such that the electronic device can be compatible with the SIM cards with various working voltages, thereby the functions of the electronic device are enriched.

The communication structure and principle of the communication system according to the embodiments of the present disclosure have been explained with reference to the embodiments of FIGS. 1 and 2, hereinafter, the power supply circuit and principle of the communication system according to the embodiments of the present disclosure will be explained with reference to the embodiment of FIG. 3.

Figure 3:
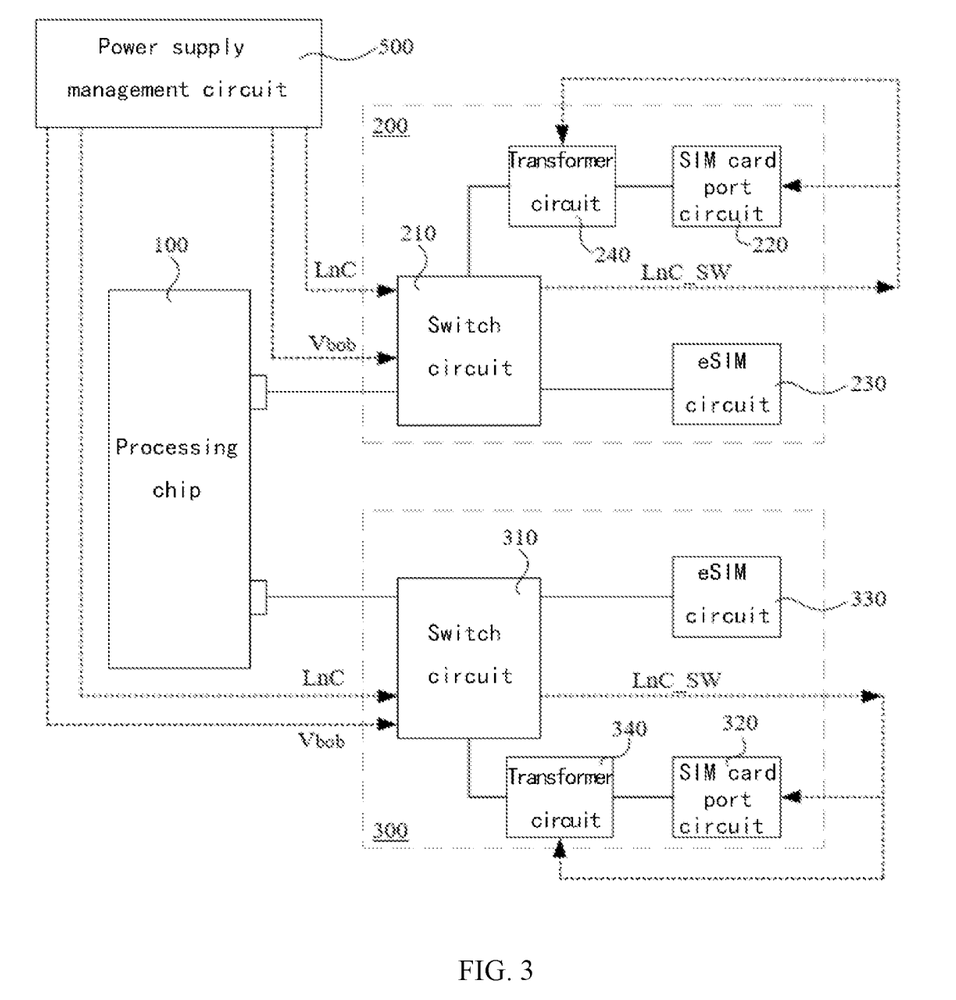
FIG. 3 is a circuit structure diagram of a communication system according to some embodiments of the present disclosure.

As shown in FIG. 3, in this exemplary embodiment, in order to distinguish from the signal lines in the previous embodiments, the power supply lines are indicated by dotted arrows, and the following description will be made with reference to the example of FIG. 3.

In the example of FIG. 3, the communication system described in the present disclosure further includes a power supply management circuit 500, the power supply management circuit 500 is used to manage the system power supply of the electronic device, and the input terminal of the power supply management circuit 500 can be connected to the main power supply of the electronic device, and the output terminal of the power supply management circuit 500 can supply power to various electronic components. In some embodiments, the power supply management circuit 500 can be a Power supply management Integrated Circuits (PMIC) chip.

In the embodiments of the present disclosure, the power supply management circuit 500 includes at least a first power supply terminal and a second power supply terminal. The first power supply terminal is connected with the switch circuit and used for providing power supply to the switch circuit. For example, as shown in FIG. 3, the power supply Vbob is outputted by the first power supply terminal, and Vbob is connected with the switch circuit 210 and the switch circuit 310, so as to supply power to the switch circuit 210 and the switch circuit 310, such that the switch circuit 210 and the switch circuit 310 are powered on to operate.

The second power supply terminal is connected with the SIM card port circuit through the switch circuit and is used for providing power supply to the SIM card port circuit. For example, as shown in FIG. 3, the power supply LnC is output by the second power supply terminal, and LnC is connected to the SIM card port circuit 220 and the SIM card port circuit 320 after passing through the switch circuit 210 and the switch circuit 310, so as to supply power to the SIM card port circuit 220 and the SIM card port circuit 320, such that the SIM card port circuit 220 and the SIM card port circuit 320 are powered on to operate.

In some embodiments, the LnC power supply outputted by the second power supply terminal can cover the voltages of 1.8V and 3V, thereby it can supply power to the SIM cards with different voltage requirements, such that the electronic device can be compatible with various types of SIM cards.

It can be understood that the output power supply LnC of the second power supply terminal can directly supply power to the SIM card port circuit, that is, the LnC line does not need to pass through the switch circuit. However, if the LnC power supply always supplies normal power to the SIM card port circuit, the SIM card port circuit will always be powered on, which will easily cause the SIM card to be short-circuited or even burned when the user plugs or unplugs the SIM card.

Therefore, in the embodiment illustrated in FIG. 3 of the present disclosure, the power supply LnC outputted by the second power supply terminal of the power supply management circuit 500 passes through the switch circuit, and is controlled to be ON/OFF by the switch circuit, so as to avoid the situation that the SIM is continuously powered on. The following description will take the switch circuit 210 as an example.

In some embodiments, the switch circuit 210 includes a first power input terminal and a first power output terminal. The first power input terminal is connected to the second power supply terminal of the power supply management circuit, that is, the first power input terminal of the switch circuit 210 is connected to the LnC power supply line, and the first power output terminal of the switch circuit 210 is connected to the SIM card port circuit 220.

When the first terminal of the switch circuit 210 is connected with the SIM card port circuit 220, it means that the SIM card port circuit 220 is in a working state, and the eSIM circuit 230 is in a signal interruption state. At this time, the switch circuit 210 can control the first power input terminal to be connected with the first power output terminal, that is, as shown in FIG. 3, the first power input terminal is connected to the power supply line LnC, and the first power output terminal outputs the power supply LnC_SW to supply power to the SIM card port circuit 220.

When the first terminal of the switch circuit 210 is connected with the eSIM circuit 230, it means that at this time the SIM card port circuit 220 is in a signal interruption state, and the eSIM circuit 230 is in a working state. At this time, the SIM card port circuit 220 should be powered down, such that the switch circuit 210 can control the first power input terminal to be disconnected from the first power output terminal, that is, as shown in FIG. 3, the power supply LnC_SW of the first power output terminal makes no output any more, such that the SIM card port circuit 220 is powered off.

In some embodiments, the voltage transformer circuit described above includes a level shift circuit. The working principle of the level shift circuit will be described below by taking the transformer circuit 240 as an example.

As shown in FIG. 3, the level shift circuit includes a signal input terminal, a signal output terminal, and a reference level input terminal. The signal input terminal is connected to the second terminal of the switch circuit 210, the signal output terminal is connected to the SIM card port circuit 220, and the reference level input terminal is connected to the power supply line of the SIM card port circuit 220, that is, the power supply line LnC_SW.

According to the above, it can be seen that the power supply LnC can cover the 1.8V and 3V power supply voltages required by different types of SIM cards, such that the level shift circuit can obtain the power supply voltage of the SIM card port circuit 220 through the reference level input terminal, and adjust the voltage of communication data at the signal output terminal based on the power supply voltage.

For example, in an example, the LnC_SW supplies the SIM card port circuit 220 with a voltage of 3V, the level shift circuit can boost the 1.8V data signal inputted at the signal input terminal to 3V based on the reference voltage of 3V and output it to the SIM card port circuit 220 from the signal output terminal.

The power supply principle of the second communication circuit 300 is the same as that of the above embodiment, implementation can be made by those skilled in the art with reference to the above, and no details will be described in the present disclosure.

It can be seen from the above that, in the embodiments of the present disclosure, the switch unit is used to switch between the physical SIM card and the eSIM, such that multiple SIM card functions of the electronic device can be realized without increasing the card slot space of the electronic device or changing the underlying structure of the device chip, and the convenience of using by the users can be improved. Furthermore, the data signal voltage inputted to the SIM card port circuit is converted by the voltage transformer circuit, such that the electronic device can be compatible with SIM cards with various working voltages, thereby the functions of the electronic devices are enriched. Furthermore, the switch circuit is used to control ON/OFF of the power supply of the SIM card port circuit, so as to prevent the SIM card port circuit from being powered on continuously and reduce the risk of the SIM card being broken and burned.

It is seen based on the above that in the related technologies, the eSIM circuit is integrated in the NFC chip, such that the power supply to the SIM card port circuit can also pass through the NFC chip, and description will be made below with reference to the embodiment of FIG. 4.

Figure 4:
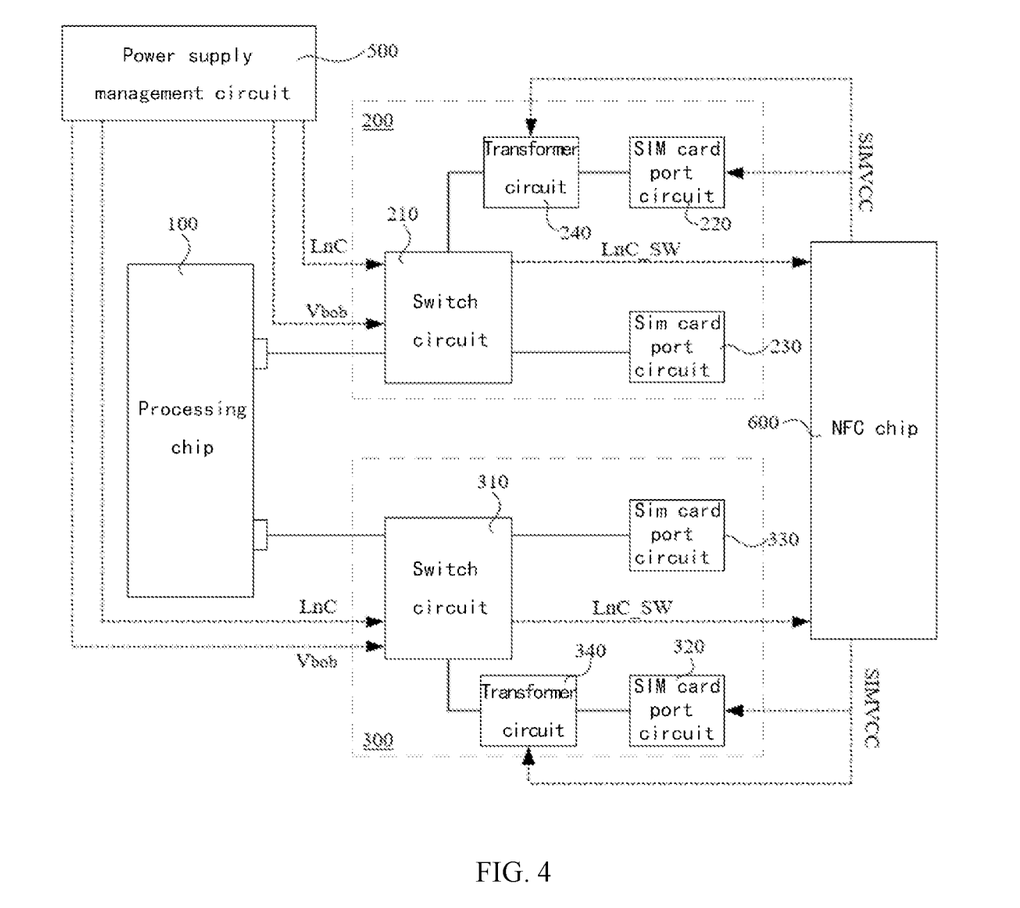
FIG. 4 is a circuit structure diagram of a communication system according to some embodiments of the present disclosure.

As shown in FIG. 4, in some embodiments, the communication system of the example according to the present disclosure further includes an NFC chip 600, and the power supply LnC_SW of the first power output terminal of the switch circuit can supply power to the SIM card port after passing through the NFC chip 600. The first communication circuit 200 is still taken as an example to explain below.

As shown in FIG. 4, the NFC chip includes a second power input terminal and a second power output terminal. The second power input terminal is connected to the first power output terminal of the switch circuit 210, that is, after the power supply LnC_SW outputted by the switch circuit 210 passes through the NFC chip, the power supply SIMVCC is outputted through the second power output terminal of the NFC chip, thereby supplying power to the SIM card port circuit 220.

In the embodiments of the present disclosure, as described above, the switch circuit is used to control ON/OFF of power supply of the SIM card port circuit, or the NFC chip can be used to control the power supply of the SIM card port circuit. However, in order to ensure synchronization between power supply and data signal, it is preferable to use the switch circuit to control ON/OFF of the power supply of the SIM card port circuit. This is because the switch circuit can control switching of the signal lines at the same time, thereby avoiding the problem of asynchronization between power supply and data signal. Those skilled in the art can understand this, and the present disclosure makes no limitation thereto.

It can be seen from the above that, in the embodiments of the present disclosure, the switch unit is used to realize the switch between the physical SIM card and the eSIM, such that multiple SIM card functions of the electronic device can be realized without increasing the card slot space of the electronic device or changing the underlying structure of the device chip, and the convenience of using by the users can be improved. Furthermore, the data signal voltage inputted to the SIM card port circuit is converted by the voltage transformer circuit, such that the electronic device can be compatible with SIM cards with various working voltages, thereby the functions of the electronic device is enriched. Furthermore, the switch circuit is used to control ON/OFF of the power supply of the SIM card port circuit, so as to prevent the SIM card port circuit from being powered on continuously and reduce the risk of the SIM card being broken and burned.

In a second aspect, the embodiments of the present disclosure provide an electronic device, which can be any device type with the communication capability, such as smart phones, tablet computers, wearable devices, etc., and the present disclosure make no limitations thereto.

In some embodiments, the electronic device described in the present disclosure includes the communication system of any of the above embodiments, and the communication system can be arranged on the motherboard of the electronic device. Those skilled in the art can understand and make full implementation by referring to the above description, and no details will be described in the present disclosure.

In some embodiments, the electronic device described in the present disclosure can be a mobile terminal such as a smart phone, a tablet computer, etc., so as to realize multiple SIM card functions of the mobile terminal.

Figure 5:
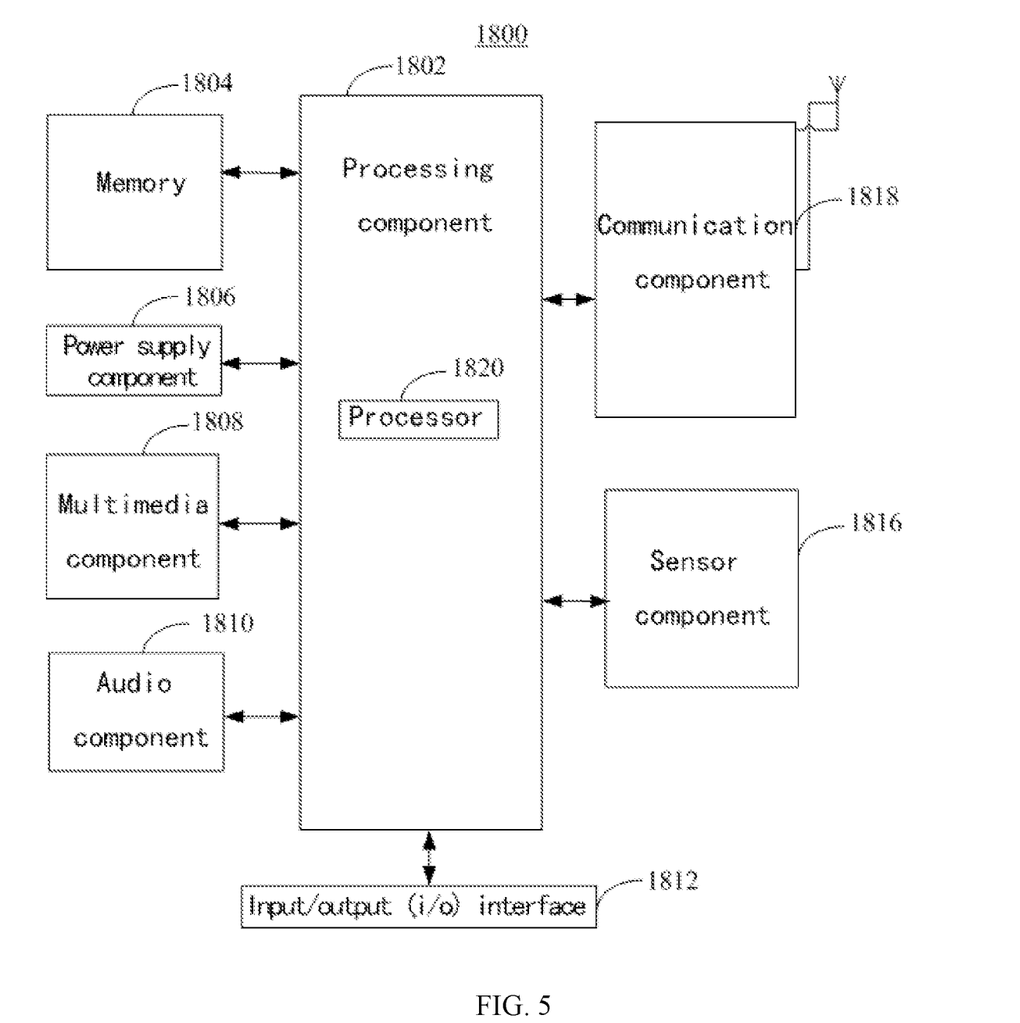
FIG. 5 is a structural block diagram of an electronic device according to some embodiments of the present disclosure.

FIG. 5 shows the structure of an electronic device in some embodiments of the present disclosure, and the electronic devices in some embodiments of the present disclosure will be described below with reference to FIG. 5.

Referring to FIG. 5, the electronic device 1800 can include one or more of the following components: a processing component 1802, a memory 1804, a power supply component 1806, a multimedia component 1808, an audio component 1810, an input/output (I/O) interface 1812, a sensor component 1816, and communication component 1818.

The processing component 1802 typically controls overall operations of the electronic device 1800, such as the operations associated with display, telephone calls, data communications, camera operations, and recording operations. The processing component 1802 can include one or more processors 1820 to execute instructions. Moreover, the processing component 1802 can include one or more modules which facilitate the interaction between the processing component 1802 and other components. For instance, the processing component 1802 can include a multimedia module to facilitate the interaction between the multimedia component 1808 and the processing component 1802. Another example, the processing component 1802 can read the executable instructions from the memory to realize the related functions of the electronic device.

The memory 1804 is configured to store various types of data to support the operation of the electronic device 1800. Examples of such data include instructions for any applications or methods operated on the electronic device 1800, contact data, phonebook data, messages, pictures, video, etc. The memory 1804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the electronic device 1800. The power component 1806 can include a power management system, one or more power sources, and any other components associated with the generation, management, and distribution of power in the electronic device 1800.

The multimedia component 1808 includes a display screen providing an output interface between the electronic device 1800 and the user. In some embodiments, the multimedia component 1808 includes a front camera and/or a rear camera. The front camera and/or the rear camera can receive an external multimedia datum while the electronic device 1800 is in an operation mode, such as a photographing mode or a video mode. Each of the front camera and the rear camera can be a fixed optical lens system or have focus and optical zoom capability.

The audio component 1810 is configured to output and/or input audio signals. For example, the audio component 1810 includes a microphone ("MIC") configured to receive an external audio signal when the electronic device 1800 is in an operation mode, such as a call mode, a recording mode, and a voice recognition mode. The received audio signal can be further stored in the memory 1804 or transmitted via the communication component 1816. In some embodiments, the audio component 1810 further includes a speaker to output audio signals.

The I/O interface 1812 provides an interface between the processing component 1802 and peripheral interface modules, such as a keyboard, a click wheel, buttons, and the like. The buttons can include, but are not limited to, a home button, a volume button, a starting button, and a locking button.

The sensor component 1816 includes one or more sensors to provide status assessments of various aspects of the electronic device 1800. For instance, the sensor component 1816 can detect an open/closed status of the electronic device 1800, relative positioning of components, e.g., the display and the keypad, of the electronic device 1800, a change in position of the electronic device 1800 or a component of the electronic device 1800, a presence or absence of user contact with the electronic device 1800, an orientation or an acceleration/deceleration of the electronic device 1800, and a change in temperature of the electronic device 1800. The sensor component 1816 can include a proximity sensor configured to detect the presence of nearby objects without any physical contact. The sensor component 1816 can also include a light sensor, such as a CMOS or CCD image sensor, for use in imaging applications. In some embodiments, the sensor component 1816 can also include an accelerometer sensor, a gyroscope sensor, a magnetic sensor, a pressure sensor, or a temperature sensor.

The communication component 1818 is configured to facilitate communication, wired or wirelessly, between the electronic device 1800 and other devices. The electronic device 1800 can access a wireless network based on a communication standard, such as Wi-Fi, 2G, 3G, 4G, 5G, or 6G, or a combination thereof. In one exemplary embodiment, the communication component 1818 receives a broadcast signal or broadcast associated information from an external broadcast management system via a broadcast channel. In one exemplary embodiment, the communication component 1816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 1800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

It can be seen from the above that, in the embodiments of the present disclosure, the switch unit is used to switch between the physical SIM card and the eSIM, such that multiple SIM card functions of the electronic device can be realized without increasing the card slot space of the electronic device or changing the underlying structure of the device chip, and the convenience of using by the users can be improved. Furthermore, the data signal voltage inputted to the SIM card port circuit is converted by the voltage transformer circuit, such that the electronic device can be compatible with SIM cards with various working voltages, accordingly the functions of the electronic devices are enriched. Furthermore, the switch circuit is used to control ON/OFF of the power supply of the SIM card port circuit, so as to prevent the SIM card port circuit from being powered on continuously and reduce the risk of the SIM card being broken and burned.

It is apparent that the above-described embodiments are only examples for clear explanation, rather than limitations on the embodiments. For those of ordinary skill in the art, other changes or variations of different forms can be made on the basis of the above description. It is not necessary and impossible to exhaust all the embodiments herein. However, the obvious changes or variations derived therefrom are still within the protection scope created by the present disclosure.

What is claimed is:

1. A communication system, comprising:
    a processing chip that comprises a first communication interface and a second communication interface; and
    two sets of communication circuits, wherein one set of communication circuits is connected to the first communication interface, and the other set of communication circuits is connected to the second communication interface;
    wherein each set of the communication circuits comprises a switch circuit, a Subscriber Identity Module (SIM) card port circuit and at least one eSIM circuit, the switch circuit comprises a first terminal and at least two second terminals, the first terminal is connected to the first communication interface or the second communication interface, the at least two second terminals are respectively connected to the SIM card port circuit and the at least one eSIM circuit in one-to-one correspondence, and the first terminal of the switch circuit is switched to be connected with each second terminal.

2. The communication system according to claim 1, wherein
    the switch circuit further comprises a control terminal, the control terminal is connected to a control pin of the processing chip, and the switch circuit is used to switch the first terminal to be connected with a target second terminal of the at least two second terminals based on a control signal received by the control terminal.

3. The communication system according to claim 1, wherein the communication circuit further comprises a transformer circuit, the second terminal of the switch circuit is connected to the SIM card port circuit through the transformer circuit, and the transformer circuit is used to adjust a voltage of communication data outputted to the SIM card port circuit.

4. The communication system according to claim 3, wherein
the transformer circuit comprises a level conversion circuit, and the level conversion circuit comprises a signal input terminal, a signal output terminal and a reference level input terminal; the signal input terminal is connected to the second terminal of the switch circuit, the signal output terminal is connected to the SIM card port circuit, and the reference level input terminal is connected to a power supply line of the SIM card port circuit; and
the level conversion circuit is used to adjust a voltage of communication data of the signal output terminal based on a power supply voltage of the SIM card port circuit.

5. The communication system according to claim 1, wherein
the communication system is disposed on a mainboard of a mobile terminal, the eSIM circuit comprises an eSIM chip, and the eSIM chip is disposed on the mainboard near the processing chip.

6. The communication system according claim 1, further comprising:
a power supply management circuit that comprises a first power supply terminal and a second power supply terminal, the first power supply terminal is connected to the switch circuit for supplying power to the switch circuit; and the second power supply terminal is connected to the SIM card port circuit through the switch circuit for supplying power to the SIM card port circuit.

7. The communication system according to claim 6, wherein
the switch circuit comprises a first power input terminal and a first power output terminal, the first power input terminal is connected to the second power supply terminal of the power supply management circuit, and the first power output terminal is connected to the SIM card port circuit, and the switch circuit is used to control ON/OFF of the first power input terminal and the first power output terminal.

8. The communication system according to claim 7, further comprising:
a near field communication (NFC) chip that comprises a second power input terminal and a second power output terminal, the second power input terminal is connected to the first power output terminal, and the second power output terminal is connected to the SIM card port circuit.

9. An electronic device, comprising a communication system, wherein
the communication system comprises:
a processing chip that comprises a first communication interface and a second communication interface; and
two sets of communication circuits, wherein one group set of communication circuits is connected to the first communication interface, and the other set of communication circuits is connected to the second communication interface;
wherein each set of the communication circuits comprises a switch circuit, a Subscriber Identity Module (SIM) card port circuit and at least one eSIM circuit, the switch circuit comprises a first terminal and at least two second terminals, the first terminal is connected to the first communication interface or the second communication interface, the at least two second terminals are respectively connected to the SIM card port circuit and the at least one eSIM circuit in one-to-one correspondence, and the first terminal of the switch circuit is switched to be connected with each second terminal.

10. The electronic device according to claim 9, wherein the electronic device comprises a mobile terminal.

11. The electronic device according to claim 9, wherein
the switch circuit further comprises a control terminal, the control terminal is connected to a control pin of the processing chip, and the switch circuit is used to switch the first terminal to be connected with a target second terminal of the at least two second terminals based on a control signal received by the control terminal.

12. The electronic device according to claim 9, wherein
the communication circuit further comprises a transformer circuit, the second terminal of the switch circuit is connected to the SIM card port circuit through the transformer circuit, and the transformer circuit is used to adjust a voltage of communication data outputted to the SIM card port circuit.

13. The electronic device according to claim 12, wherein
the transformer circuit comprises a level conversion circuit, and the level conversion circuit comprises a signal input terminal, a signal output terminal and a reference level input terminal; the signal input terminal is connected to the second terminal of the switch circuit, the signal output terminal is connected to the SIM card port circuit, and the reference level input terminal is connected to a power supply line of the SIM card port circuit; and
the level conversion circuit is used to adjust a voltage of communication data of the signal output terminal based on a power supply voltage of the SIM card port circuit.

14. The electronic device according to claim 9, wherein
the communication system is disposed on a mainboard of a mobile terminal, the eSIM circuit comprises an eSIM chip, and the eSIM chip is disposed on the mainboard near the processing chip.

15. The electronic device according claim 9, further comprising:
a power supply management circuit that comprises a first power supply terminal and a second power supply terminal, the first power supply terminal is connected to the switch circuit for supplying power to the switch circuit; and the second power supply terminal is connected to the SIM card port circuit through the switch circuit for supplying power to the SIM card port circuit.

16. The electronic device according to claim 15, wherein
the switch circuit comprises a first power input terminal and a first power output terminal, the first power input terminal is connected to the second power supply terminal of the power supply management circuit, and the first power output terminal is connected to the SIM card port circuit, and the switch circuit is used to control ON/OFF of the first power input terminal and the first power output terminal.

17. The electronic device according to claim 16, further comprising:
a near field communication (NFC) chip that comprises a second power input terminal and a second power output terminal, the second power input terminal is connected to the first power output terminal, and the second power output terminal is connected to the SIM card port circuit.

* * * * *